(12) United States Patent
Baarman et al.

(10) Patent No.: US 7,612,528 B2
(45) Date of Patent: Nov. 3, 2009

(54) VEHICLE INTERFACE

(75) Inventors: David W. Baarman, Fennville, MI (US); Terry L. Lautzenheiser, Nunica, MI (US); Thomas Jay Leppien, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 493 days.

(21) Appl. No.: 10/871,420

(22) Filed: Jun. 18, 2004

(65) Prior Publication Data

US 2005/0007067 A1 Jan. 13, 2005
US 2008/0001572 A9 Jan. 3, 2008

Related U.S. Application Data

(63) Continuation-in-part of application No. 10/357,932, filed on Feb. 4, 2003, now Pat. No. 7,126,450, which is a continuation-in-part of application No. 10/246,155, filed on Sep. 18, 2002, now Pat. No. 6,825,620, and a continuation-in-part of application No. 10/133,860, filed on Apr. 26, 2002, now Pat. No. 6,731,071, and a continuation-in-part of application No. 09/592,194, filed on Jun. 12, 2000, now Pat. No. 6,436,299, application No. 10/871,420, which is a continuation-in-part of application No. 10/175,095, filed on Jun. 18, 2002, now Pat. No. 6,673,250, which is a continuation-in-part of application No. 09/592,194, filed on Jun. 12, 2000, now Pat. No. 6,436,299, said application No. 10/357,932 is a continuation-in-part of application No. 29/165,043, filed on Aug. 2, 2002, now Pat. No. Des. 476,095, and a continuation-in-part of application No. 29/165,008, filed on Aug. 2, 2002, now Pat. No. Des. 479,356, and a continuation-in-part of application No. 29/165,012, filed on Aug. 2, 2002, now Pat. No. Des. 476,094, and a continuation-in-part of application No. 29/165,005, filed on Aug. 2, 2002, now Pat. No. Des. 479,892, and a continuation-in-part of application No. 29/165,009, filed on Aug. 2, 2002, now Pat. No. Des. 475,471, and a continuation-in-part of application No. 29/165,011, filed on Aug. 2, 2002, now Pat. No. Des. 478,834, said application No. 10/871,420 is a continuation-in-part of application No. 10/689,148, filed on Oct. 20, 2003, and a continuation-in-part of application No. 10/175,095, filed on Jun. 18, 2002, now Pat. No. 6,673,250, which is a continuation-in-part of application No. 09/592,194, filed on Jun. 12, 2000, now Pat. No. 6,436,299, application No. 10/871,420, which is a continuation-in-part of application No. 10/689,154, filed on Oct. 20, 2003, now abandoned, and a continuation-in-part of application No. 10/689,224, filed on Oct. 20, 2003, now Pat. No. 7,132,918, which is a continuation-in-part of application No. 10/357,932, filed on Feb. 4, 2003, now Pat. No. 7,126,450, application No. 10/871,420, which is a continuation-in-part of application No. 10/689,375, filed on Oct. 20, 2003, which is a continuation-in-part of application No. 10/357,932, filed on Feb. 4, 2003, now Pat. No. 7,126,450.

(60) Provisional application No. 60/140,159, filed on Jun. 21, 1999, provisional application No. 60/140,090, filed on Jun. 21, 1999, provisional application No. 60/444,794, filed on Feb. 4, 2003.

(51) Int. Cl.
*H02J 7/00* (2006.01)
*B60L 1/00* (2006.01)
*B60L 3/00* (2006.01)
*H02G 3/00* (2006.01)

(52) U.S. Cl. .......................... 320/108; 320/107; 307/9.1

(58) Field of Classification Search ................. 320/107, 320/108, 134, 115; 307/90.1, 10.1
See application file for complete search history.

(56) References Cited

U.S. PATENT DOCUMENTS

| | | |
|---|---|---|
| 602,966 A | 4/1898 | Wallach |
| 843,534 A | 2/1907 | Hewitt |
| 1,137,333 A | 4/1915 | Klorer |

| Patent No. | Date | Name | | Patent No. | Date | Name | |
|---|---|---|---|---|---|---|---|
| 1,604,870 A | 10/1926 | Asman | | 5,280,416 A | 1/1994 | Hartley et al. | |
| 1,803,571 A | 5/1931 | Ulman | | 5,289,085 A | 2/1994 | Godyak et al. | |
| 1,852,740 A | 4/1932 | Doane | | 5,300,860 A | 4/1994 | Godyak et al. | |
| 2,199,107 A | 4/1940 | Kibbe | | 5,301,096 A | 4/1994 | Klontz et al. | |
| 2,265,475 A | 12/1941 | Fodor | | 5,311,028 A | 5/1994 | Glavish | |
| 2,353,063 A | 7/1944 | Otis | | 5,339,233 A | 8/1994 | Yang | |
| 2,686,866 A | 8/1954 | Williams | | 5,341,280 A | 8/1994 | Divan et al. | |
| 2,726,116 A | 12/1955 | Barber | | 5,416,388 A | 5/1995 | Shackle | |
| 2,731,547 A | 1/1956 | Callard | | 5,422,519 A | 6/1995 | Russell | |
| 3,047,765 A | 7/1962 | Vichill | | 5,450,305 A | 9/1995 | Boys et al. | |
| 3,292,579 A | 12/1966 | Buchanan | | 5,455,466 A * | 10/1995 | Parks et al. | 307/104 |
| 3,550,682 A | 12/1970 | Fowler | | 5,455,467 A | 10/1995 | Young et al. | |
| 3,551,091 A | 12/1970 | Veloz | | 5,465,025 A | 11/1995 | Hendrickson | |
| 3,628,086 A | 12/1971 | Nuckolls | | 5,506,560 A | 4/1996 | Takeuchi et al. | |
| 3,641,336 A | 2/1972 | Boin | | 5,536,979 A | 7/1996 | McEachern et al. | |
| 3,743,989 A | 7/1973 | Nicolas et al | | 5,550,452 A | 8/1996 | Shirai et al. | |
| 3,746,906 A | 7/1973 | Cardwell, Jr. | | 5,553,312 A | 9/1996 | Gattey et al. | |
| 3,867,661 A | 2/1975 | Waltz et al | | 5,594,304 A | 1/1997 | Graber | |
| 3,885,185 A | 5/1975 | Tilley | | 5,600,225 A | 2/1997 | Goto | |
| 3,885,211 A | 5/1975 | Gutai | | 5,611,918 A | 3/1997 | Markham | |
| 3,923,663 A | 12/1975 | Reid | | 5,619,182 A | 4/1997 | Robb | |
| 3,938,018 A | 2/1976 | Dahl | | 5,653,531 A | 8/1997 | Yang | |
| 4,005,330 A | 1/1977 | Glascock, Jr. et al. | | 5,675,677 A | 10/1997 | Davenport et al. | |
| 4,010,400 A | 3/1977 | Hollister | | 5,680,028 A | 10/1997 | McEachern | |
| 4,017,764 A | 4/1977 | Anderson | | 5,716,126 A | 2/1998 | Meyer | |
| 4,038,625 A | 7/1977 | Tompkins et al. | | 5,747,894 A | 5/1998 | Hirai et al. | |
| 4,093,893 A | 6/1978 | Anderson | | 5,771,438 A | 6/1998 | Palermo et al. | |
| 4,101,777 A | 7/1978 | Reid | | 5,796,334 A | 8/1998 | Chen | |
| 4,117,378 A | 9/1978 | Glascock, Jr. | | 5,814,900 A | 9/1998 | Esser et al. | |
| 4,282,563 A | 8/1981 | Ohta et al. | | 5,831,348 A | 11/1998 | Nishizawa | |
| 4,300,073 A | 11/1981 | Skwirut et al. | | 5,831,516 A | 11/1998 | Jennings | |
| 4,389,595 A | 6/1983 | Kamei et al. | | 5,834,905 A | 11/1998 | Godyak et al. | |
| 4,414,489 A | 11/1983 | Young | | 5,905,343 A | 5/1999 | McCamant | |
| 4,556,837 A * | 12/1985 | Kobayashi et al. | 320/108 | 5,923,544 A | 7/1999 | Urano | |
| 4,584,707 A | 4/1986 | Goldberg et al. | | 5,928,505 A | 7/1999 | Inakagata et al. | |
| 4,615,799 A | 10/1986 | Mortensen | | 5,929,598 A | 7/1999 | Nakama et al. | |
| 4,637,434 A | 1/1987 | Moen | | 5,929,604 A * | 7/1999 | Irvin | 320/136 |
| 4,675,573 A | 6/1987 | Miram et al. | | 5,949,155 A | 9/1999 | Tamura et al. | |
| 4,675,638 A | 6/1987 | Szabo | | 5,951,155 A | 9/1999 | Lanser | |
| 4,747,158 A | 5/1988 | Goldberg et al. | | 5,952,814 A | 9/1999 | VanLergerghe | |
| 4,752,401 A | 6/1988 | Bodenstein | | 5,980,056 A | 11/1999 | West | |
| 4,762,613 A | 8/1988 | Snowball | | 5,990,611 A | 11/1999 | Lee | |
| 4,772,991 A | 9/1988 | Wood | | 6,005,304 A | 12/1999 | Seelig | |
| 4,800,328 A | 1/1989 | Bolger et al. | | 6,020,682 A | 2/2000 | Holzer | |
| 4,812,702 A | 3/1989 | Anderson | | 6,027,225 A | 2/2000 | Martin et al. | |
| 4,816,977 A | 3/1989 | Sorensen | | 6,028,413 A | 2/2000 | Brockmann | |
| 4,818,855 A | 4/1989 | Mongeon et al. | | 6,075,433 A | 6/2000 | Ono et al. | |
| 4,838,797 A | 6/1989 | Dodier | | 6,118,249 A | 9/2000 | Brockmann et al. | |
| 4,854,214 A | 8/1989 | Lowe | | 6,141,710 A * | 10/2000 | Miesterfeld | 710/100 |
| 4,857,204 A | 8/1989 | Joklik | | 6,150,796 A * | 11/2000 | Ford | 320/128 |
| 4,894,591 A | 1/1990 | Witting | | 6,160,371 A | 12/2000 | Tachikawa | |
| 4,954,756 A | 9/1990 | Wood et al. | | 6,161,032 A | 12/2000 | Acker | |
| 4,958,266 A | 9/1990 | Sorensen et al. | | 6,166,494 A | 12/2000 | Green | |
| 4,968,437 A | 11/1990 | Noll et al. | | 6,188,179 B1 | 2/2001 | Boys et al. | |
| 4,971,687 A | 11/1990 | Anderson | | 6,194,828 B1 | 2/2001 | Kohne et al. | |
| 4,972,120 A | 11/1990 | Witting | | 6,218,785 B1 | 4/2001 | Incerti | |
| 4,977,354 A | 12/1990 | Bergervoet et al. | | 6,241,359 B1 | 6/2001 | Lin | |
| 5,030,889 A | 7/1991 | El-Hamamsy et al. | | 6,252,380 B1 | 6/2001 | Koenck | |
| 5,039,903 A | 8/1991 | Farrall | | 6,263,247 B1 | 7/2001 | Mueller et al. | |
| 5,041,763 A | 8/1991 | Sullivan et al. | | 6,275,143 B1 | 8/2001 | Stobbe | |
| 5,054,112 A | 10/1991 | Ike | | 6,280,066 B1 | 8/2001 | Dolan | |
| 5,070,293 A | 12/1991 | Ishii et al. | | 6,291,936 B1 | 9/2001 | MacLennan et al. | |
| 5,101,332 A | 3/1992 | Hsia | | 6,301,128 B1 | 10/2001 | Jang et al. | |
| 5,122,729 A | 6/1992 | Itoga et al. | | 6,307,316 B1 | 10/2001 | Holzer | |
| 5,141,325 A | 8/1992 | Huang | | 6,322,226 B1 | 11/2001 | Dickson | |
| 5,146,140 A | 9/1992 | Piejak et al. | | 6,326,739 B1 | 12/2001 | MacLennan et al. | |
| 5,158,361 A | 10/1992 | Huang | | 6,339,296 B1 | 1/2002 | Goral | |
| 5,184,891 A | 2/1993 | Shpigel | | 6,345,203 B1 | 2/2002 | Mueller et al. | |
| 5,200,688 A * | 4/1993 | Patino et al. | 320/104 | 6,436,299 B1 | 8/2002 | Baarman et al. | |
| 5,216,402 A | 6/1993 | Carosa | | 6,459,882 B1 | 10/2002 | Palermo et al. | |
| 5,229,652 A | 7/1993 | Hough | | 6,462,432 B1 | 10/2002 | Seelig et al. | |
| 5,264,997 A | 11/1993 | Hutchisson et al. | | 6,597,076 B2 | 7/2003 | Scheible et al. | |
| 5,267,997 A | 12/1993 | Farin et al. | | 2002/0158512 A1 * | 10/2002 | Mizutani et al. | 307/9.1 |

| | | | |
|---|---|---|---|
| 2003/0006880 | A1 | 1/2003 | Zimmer |
| 2003/0210106 | A1* | 11/2003 | Cheng et al. ............ 333/24 R |
| 2003/0222769 | A1 | 12/2003 | Mau |
| 2004/0130915 | A1* | 7/2004 | Baarman ................ 363/21.02 |

FOREIGN PATENT DOCUMENTS

| | | |
|---|---|---|
| AT | 370929 | 5/1983 |
| AU | A-61741/86 | 2/1988 |
| DE | 2029468 | 12/1971 |
| DE | 4100272 | 7/1991 |
| DE | 901-2505 | 8/1991 |
| DE | 4238388 | 5/1994 |
| DE | 4421253 | 3/1995 |
| DE | 4412957 | 10/1995 |
| DE | 19540854 | 5/1997 |
| EP | 0825577 | 2/1998 |
| GB | 1349788 | 4/1974 |
| GB | 2388715 A | 11/2003 |
| GB | 2388716 A | 11/2003 |
| JP | 8-31585 | 2/1996 |
| WO | WO 97/17761 | 5/1997 |
| WO | WO 97/26704 | 7/1997 |
| WO | WO 97/26705 | 7/1997 |
| WO | WO 00/22892 | 4/2000 |
| WO | WO 00/32298 | 6/2000 |
| WO | WO 00/54387 | 9/2000 |
| WO | WO00/54387 A1 | 9/2000 |
| WO | WO 01/26427 | 4/2001 |
| WO | WO 01/26431 | 4/2001 |
| WO | WO 01/80396 A1 | 10/2001 |
| WO | WO 03/096361 | 11/2003 |
| WO | WO 03/105311 | 12/2003 |

OTHER PUBLICATIONS

"A Contactless Electrical Energy Transmission System for Portable-Telephone Battery Chargers", IEEE Transactions on Industrial Electronics, vol. 50, No. 3, Jun. 2003.

"Best of Show", Fortune, Feb. 17, 2003.

"Splashpower", www.splashpower.com, Feb. 11, 2003.

"Mobilewise", www.mobilewise.com, Feb. 11, 2003.

Gulko, Michael, et al, Inductor-Controlled Current-Sourcing Resonant Inverter and its Application as a High Pressure Discharge Lamp Driver, IEEE, pp. 434-440, May 1994.

* cited by examiner

*Primary Examiner*—Edward Tso
*Assistant Examiner*—Alexis Boateng
(74) *Attorney, Agent, or Firm*—Warner Norcross & Judd LLP

(57) ABSTRACT

A vehicle power interface includes an adaptive inductive power supply. The adaptive inductive power supply has a primary within a remote device holder. The adaptive inductive power supply is capable of providing power to remote devices placed within the remote device holder. A communication interface may be provided which can enable communication between the remote device and any data bus within the vehicle.

21 Claims, 8 Drawing Sheets

| DEV. | ID# | VOLTAGE | CURRENT | STATUS |
|---|---|---|---|---|
| -1- | 12345 | 4.0V | 100 mA | ON |
| -2- | 12346 | 2.5V | 1000 mA | OFF |
| -3- | 12347 | 1.0V | 10 mA | CH |

VEHICLE INTERFACE

RELATED APPLICATIONS

I. Priority Claim

A. U.S. patent application Ser. No. 10/357,932

This application is a continuation-in-part of U.S. patent application Ser. No. 10/357,932, filed Feb. 4, 2003 now U.S. Pat. No. 7,126,450, which is a continuation-in-part of U.S. patent application Ser. No. 10/246,155, filed Sep. 18, 2002 now U.S. Pat No. 6,825,620, which is a continuation-in-part of U.S. patent application Ser. No. 10/175,095, filed Jun. 18, 2002 now U.S. Pat. No. 6,673,250, which is a continuation-in-part of U.S. patent application Ser. No. 09/592,194, filed Jun. 12, 2000 now U.S. Pat. No. 6,436,299, which claims the benefit of 1) U.S. Provisional Application No. 60/140,090, filed Jun 21, 1999: and 2) U.S. Provisional Patent Application .. No. 60/140,159, filed June 21, 1999.

U.S. application Ser. No. 10/357,932 is also a continuation-in-part of U.S. patent application Ser. No. 10/133,860, filed Apr. 26, 2002 now U.S. Pat No. 6,731,071, which is a continuation-in-part of U.S. application Ser. No. 09/592,194, filed Jun. 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

U.S. patent application Ser. No. 10/357,932 is also a continuation-in-part of U.S. patent application Ser. No. 29/165,043, filed August 2, 2002 now U.S. Pat. No. 476,095.

U.S. patent application Ser. No. 10/357,932 is also a continuation-in-part of U.S. patent application Ser. No. 29/165,008, filed Aug. 2, 2002 now U.S. Pat No. 479,356.

U.S. patent application Ser. No. 10/357,932 is also a continuation-in-part of U.S. patent application Ser. No. 29/165,012, filed Aug. 2, 2002 now U.S. Pat. No. 476,094.

U.S. patent application Ser. No. 10/357,932 is also a continuation-in-part of U.S. patent application Ser. No. 29/165,005, filed Aug. 2, 2002 now U.S. Pat. No. 479,892.

U.S. patent application Ser. No. 10/357,932 is also a continuation-in-part of U.S. patent application Ser. No. 29/165,009, filed Aug. 2, 2002 now U.S. Pat. No. 475,471.

U.S. patent application Ser. No. 10/357,932 is also a continuation-in-part of U.S. patent application Ser. No. 29/165,011, filed Aug. 2, 2002 now U.S. Pat No. 478,834.

B. U.S. patent application Ser. No. 10/689,148

This application is also a continuation-in-part of U.S. patent application Ser. No. 10/689,148, filed Oct. 20, 2003, which claims the benefit of U.S. Provisional Application No. 60/444,794, filed Feb. 4, 2003.

U.S. patent application Ser. No. 10/689,148 is also a continuation-in-part of U.S. patent application Ser. No. 10/175,095, filed on Jun. 18, 2002, which is a continuation-in-part of U.S. patent application Ser. No. 09/592,194, filed Jun. 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

C. U.S. patent application Ser. No. 10/689,154

This application is also a continuation-in-part of U.S. patent application Ser. No. 10/689,154 now abandoned.

D. U.S. patent application Ser. No. 10/689,224

This application is also a continuation-in-part of U.S. patent application Ser. No. 10/689,224, filed Oct. 20, 2003 now U.S. Pat No. 7,132,918, which is a continuation-in-part of U.S. patent application Ser. No. 10/357,932, filed Feb. 4, 2003, which is a continuation-in-part of U.S. patent application Ser. No. 10/246,155, filed Sep. 18, 2002, which is a continuation-in-part of U.S. patent application Ser. No. 10/175,095, filed Jun. 18, 2002, which is a continuation-in-part of U.S. patent application Ser. No. 09/592,194, filed Jun. 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

U.S. application Ser. No. 10/357,932 is also a continuation-in-part of U.S. patent application Ser. No. 10/133,860, filed April 26, 2002, which is a continuation-in-part of U.S. application Ser. No. 09/592,194, filed June 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

U.S. patent application Ser. No. 10/357,932 is also a continuation-in-part of U.S. patent application Ser. No. 29/165,043, filed Aug. 2, 2002.

U.S. patent application Ser. No. 10/357,932 is also a continuation-in-part of U.S. patent application Ser. No. 29/165,008, filed Aug. 2, 2002.

U.S. patent application Ser. No. 10/357,932 is also a continuation-in-part of U.S. patent application Ser. No. 29/165,012, filed Aug. 2, 2002.

U.S. patent application Ser. No. 10/357,932 is also a continuation-in-part of U.S. patent application Ser. No. 29/165,005, filed Aug. 2, 2002.

U.S. patent application Ser. No. 10/357,932 is also a continuation-in-part of U.S. patent application Ser. No. 29/165,009, filed Aug. 2, 2002.

U.S. patent application Ser. No. 10/357,932 is also a continuation-in-part of U.S. patent application Ser. No. 29/165,011, filed Aug. 2, 2002.

E. U.S. patent application Ser. No. 10/689,375

This application is also a continuation-in-part of U.S. patent application Ser. No. 10/689,375, filed Oct. 20, 2003, which claims the benefit of U.S. Provisional Application No. 60/444,794, filed Feb. 4, 2003.

U.S. patent application Ser. No. 10/689,375 is also a continuation-in-part of U.S. patent application Ser. No. 10/357,932, filed Feb. 4, 2003, which is a continuation-in-part of U.S. patent application Ser. No. 10/246,155, filed Sep. 18, 2002, which is a continuation-in-part of U.S. patent application Ser. No. 10/175,095, filed Jun. 18, 2002, which is a continuation-in-part of U.S. patent application Ser. No. 09/592,194, filed Jun. 12, 2000, which claims the benefit of U.S. Provisional Application No. 60/140,090, filed Jun. 21, 1999, and U.S. Provisional Patent Application No. 60/140,159, filed Jun. 21, 1999.

U.S. application Ser. No. 10/357,932 is also a continuation-in-part of U.S. patent application Ser. No. 10/133,860, filed April 26, 2002, which is a continuation-in-part of U.S. application Ser. No. 09/592,194, filed Jun. 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

U.S. patent application Ser. No. 10/357,932 is also a continuation-in-part of U.S. patent application Ser. No. 29/165,043, filed Aug. 2, 2002.

U.S. patent application Ser. No. 10/357,932 is also a continuation-in-part of U.S. patent application Ser. No. 29/165,008, filed Aug. 2, 2002.

U.S. patent application Ser. No. 10/357,932 is also a continuation-in-part of U.S. patent application Ser. No. 29/165,012, filed Aug. 2, 2002.

U.S. patent application Ser. No. 10/357,932 is also a continuation-in-part of U.S. patent application Ser. No. 29/165,005, filed Aug. 2, 2002.

U.S. patent application Ser. No. 10/357,932 is also a continuation-in-part of U.S. patent application Ser. No. 29/165,009, filed Aug. 2, 2002.

U.S. patent application Ser. No. 10/357,932 is also a continuation-in-part of U.S. patent application Ser. No. 29/165,011, filed Aug. 2, 2002.

F. U.S. patent application Ser. No. 10/689,499

This application is also a continuation-in-part of U.S. patent application Ser. No. 10/689,499, filed Oct. 20, 2003, which claims the benefit of U.S. Provisional Application No. 60/444,794, filed Feb. 4, 2003.

U.S. patent application Ser. No. 10/689,499 is also a continuation-in-part of application No. 10/175,095, filed Jun. 18, 2002, which is a continuation-in-part of U.S. patent application Ser. No. 09/592,194, filed Jun. 12, 2000, which claims the benefit of 1) U.S. Provisional Application No. 60/140,090, filed Jun. 21, 1999: and 2) U.S. Provisional Patent Application No. 60/140,159, filed Jun. 21, 1999.

This application incorporates by reference the following applications: "Adaptive Inductive Power Supply," Ser. No. 10/689,499; "Inductive Coil Assembly," Ser. No. 10/689,224; "Electrostatic Charge Storage Assembly," Ser. No. 10/689,154, and "Adapter," Ser. No 10/689,375.

BACKGROUND OF THE INVENTION

This invention relates to inductive charging and communication systems and more specifically to inductive charging and communication systems within a vehicle.

People may carry a variety of personal portable electronic equipment such as PDAs (Personal Data Assistants), portable entertainment devices, such as portable music players or portable DVD players, laptop computers, and cellular telephones. The portable electronic devices provide various functionality such as communication, information storage and retrieval, and entertainment. Since the devices are portable, they are often carried and used in vehicles. The devices are usually battery powered and thus tend to run out of power at inconvenient times.

Power adapters for use in a vehicle are available for such devices. However, each device often has a unique power adapter and chord, requiring that a power adapter for each device either be carried. The power adapter and the attendant chords for attachment to the portable devices are unsightly and clutter the vehicle. Since the power adapter is commonly plugged into the 12 volt DC (direct current) power by way of a cigarette lighter, it also difficult to charge more than one device at a time. Chords and adapters are thereby impractical when several portable devices are used within the vehicle.

Recently, there have been proposals to interface the portable devices to the data network within the vehicle. The SAE (Society of Automotive Engineers) has generally recognized the need for such an interface with an ITS (Intelligent Transportation System) standard. Further, Texas Instruments has proposed an ADB-1394 telematics standard based on the 1394 "firewire" communication standard which would allow portable devices to interface with the electrical systems within the vehicle.

There are problems, however. First, due to the numerous types of portable devices, there are many different types of data interfaces required for each portable device. For example, some devices may have a 1394 interface while others have a USB (Universal Serial Bus) interface. Thus, for a vehicle to interface with a plethora of devices, it may be required to supply a plug for each possible device. Second, due to the number of devices, the number of plugs for each device could be prohibitive as well as the volume of cables required to attach each portable device to the vehicle.

The SAE ITS group has suggested that a wireless network such as the IEEE (Institute of Electrical and Electronic Engineers) 802.11b be provided for each vehicle. The problem with such a wireless network is that the power consumed by the wireless portable device would increase, thereby further increasing the likelihood that the battery powering the portable device would be discharged.

Thus, a system which would provide a data interface for the portable device as well as providing power to the devices is highly desirable.

DETAILED DESCRIPTION OF THE DRAWINGS

Figure 1:
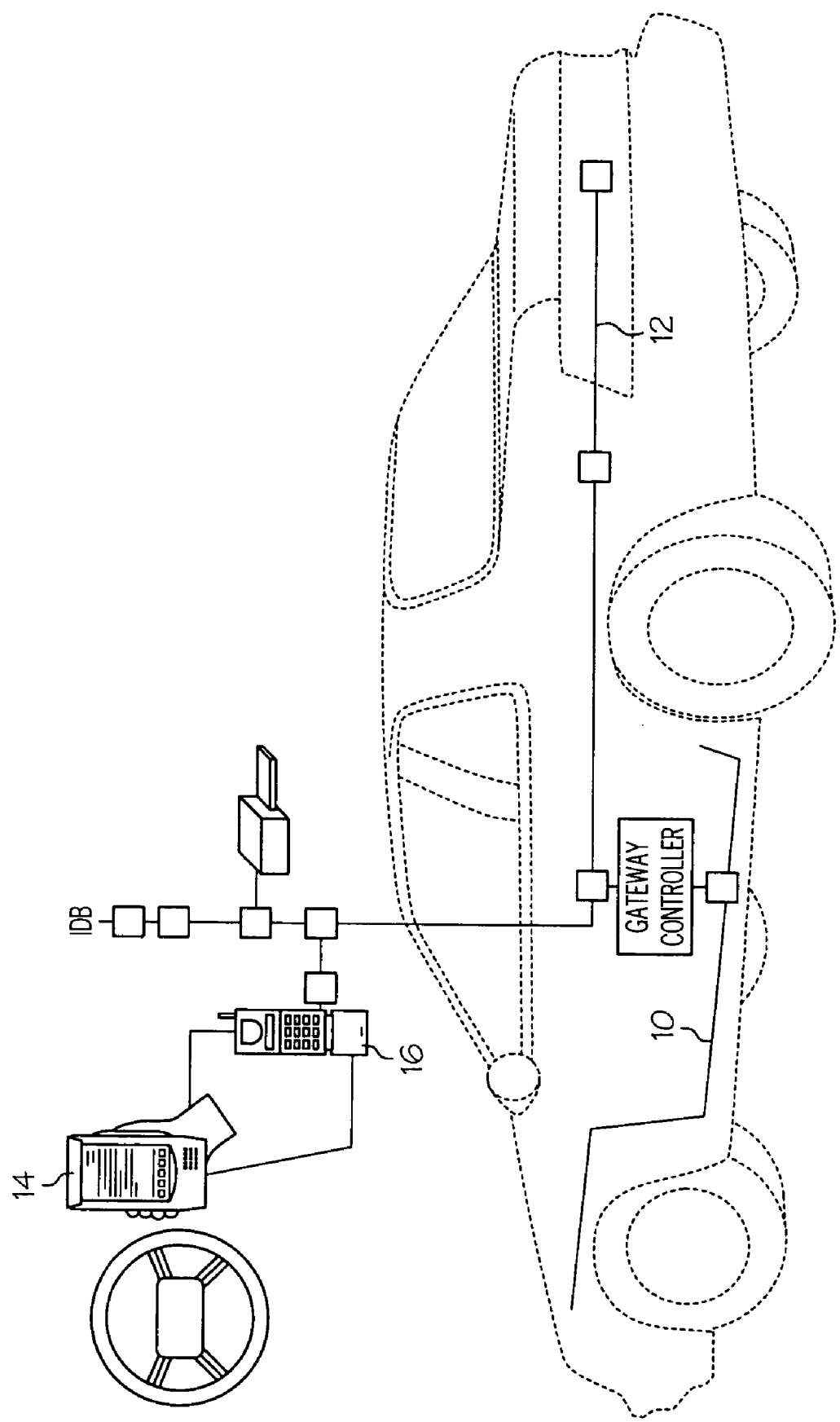
FIG. 1 is a diagram of data networks in a vehicle.

FIG. 1 shows the two parallel data networks within a vehicle. The first network is vehicle data bus 10. Vehicle data bus 10 could be a CAN (Controller Automobile Network) or an OEM (Original Equipment Manufacturers) vehicle bus. Vehicle data bus is generally a low speed data bus for enabling communication between the various controllers within a vehicle. The second network is ADB (automobile data bus) 12. ADB 12 allows communication between the one or more portable data devices and the vehicle. For example, ADB 12 could be connected with PDA 14, cellular phone 16 or portable entertainment device 18. Gateway controller 20 manages any communication between vehicle data bus 10 and ADB 12. This data can be specifically for the bus and/or contain the encoded signals of voice and audio information.

Figure 2:
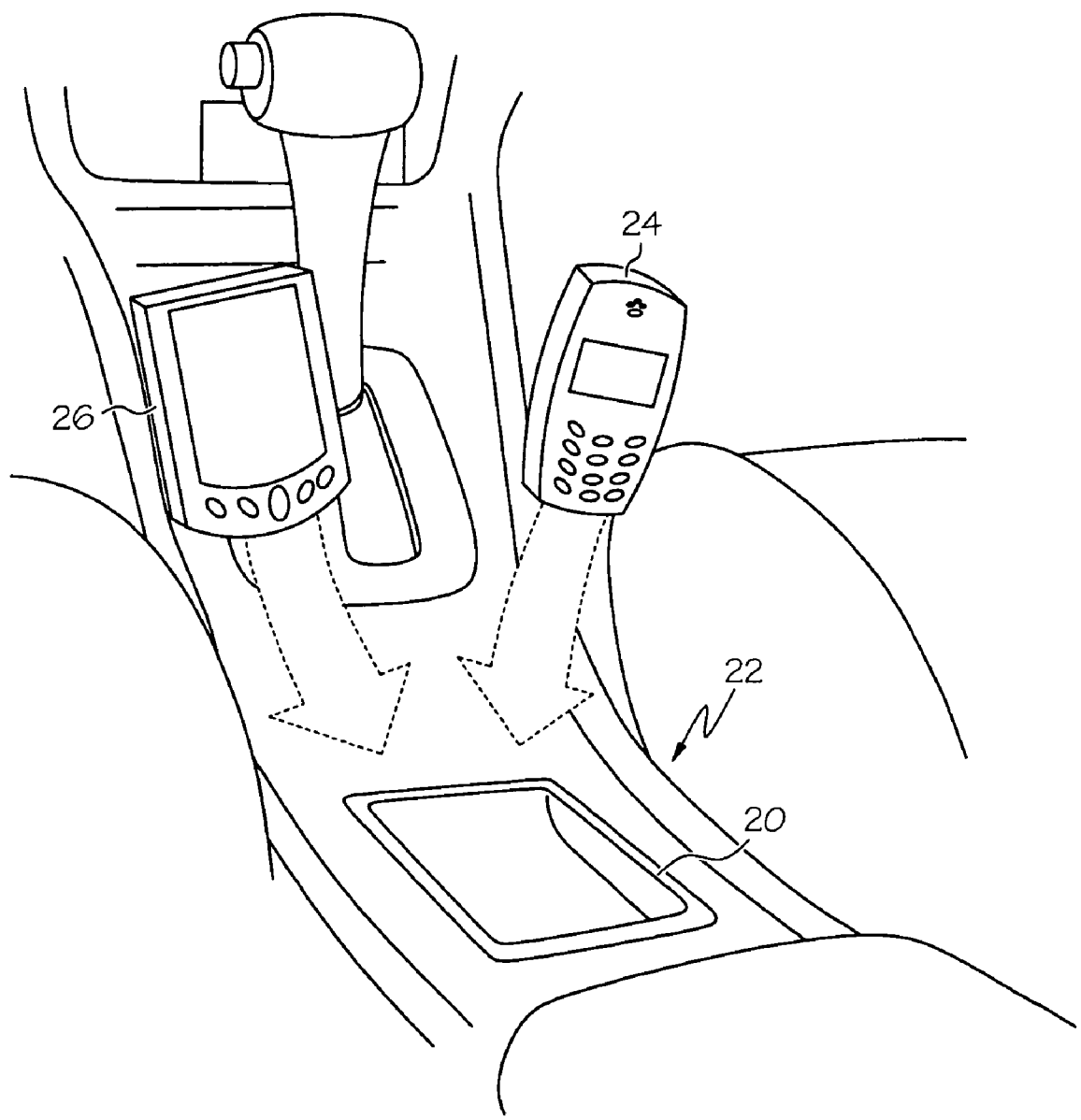
FIG. 2 shows an inductive vehicle adapter within the console of a vehicle.

FIG. 2 shows an inductive vehicle adapter 20 mounted within console 22 of a vehicle. Cellular telephone 24 and PDA 26 may be placed within the inductive vehicle adapter 20 in order to recharge and to be interfaced with ADB 12.

Figure 3:
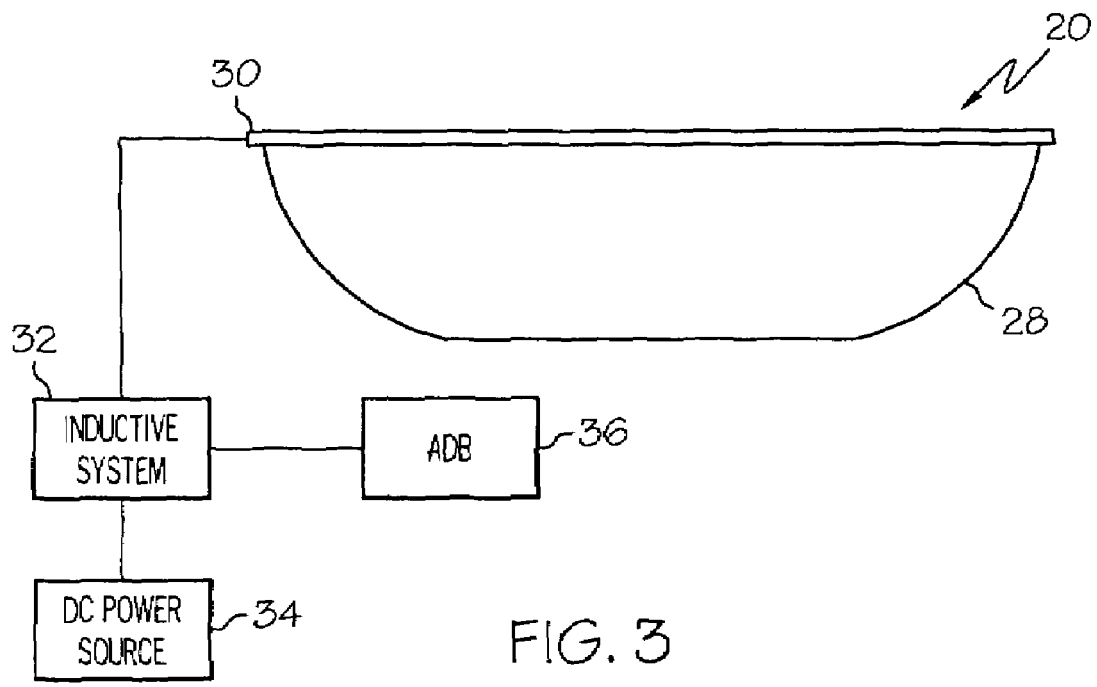
FIG. 3 shows a side view of the inductive vehicle adapter.

FIG. 3 shows a side view of inductive vehicle adapter 20. Inductive vehicle interface 20 has holder 28, which could be a bowl. Items placed within holder 28 tend to remain within the bowl due to their weight. Holder 28 has perimeter 30. Within perimeter 30 is a primary. The primary contained within perimeter 30 is coupled to inductive system 32, which is, in turn coupled to DC power source 34. Inductive system 32 is also coupled to ADB 12. Thus, electronic devices placed within holder 28 can be charged by adaptive inductive power supply 32. A communication link could be provided by circuitry working in concert with adaptive inductive power supply 32.

Figure 4:
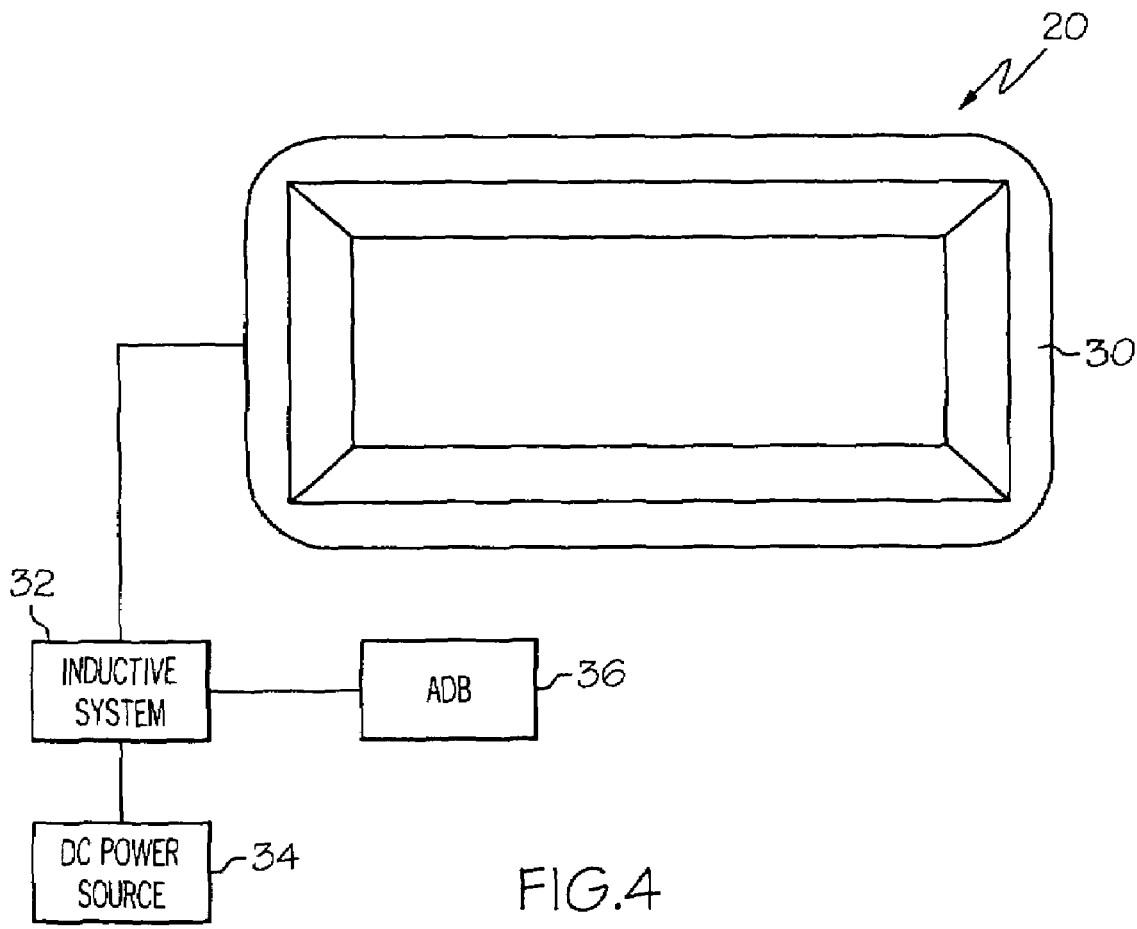
FIG. 4 shows the inductive vehicle adapter fitted within a windshield visor.

FIG. 4 is an overhead view of inductive vehicle interface 20. A remote device, which could be any portable electronic device, is placed within holder 28. When placed within holder 28, the remote devices could be both charged by vehicle interface 20 and they could also be in communication with ADB 36.

Figure 5:
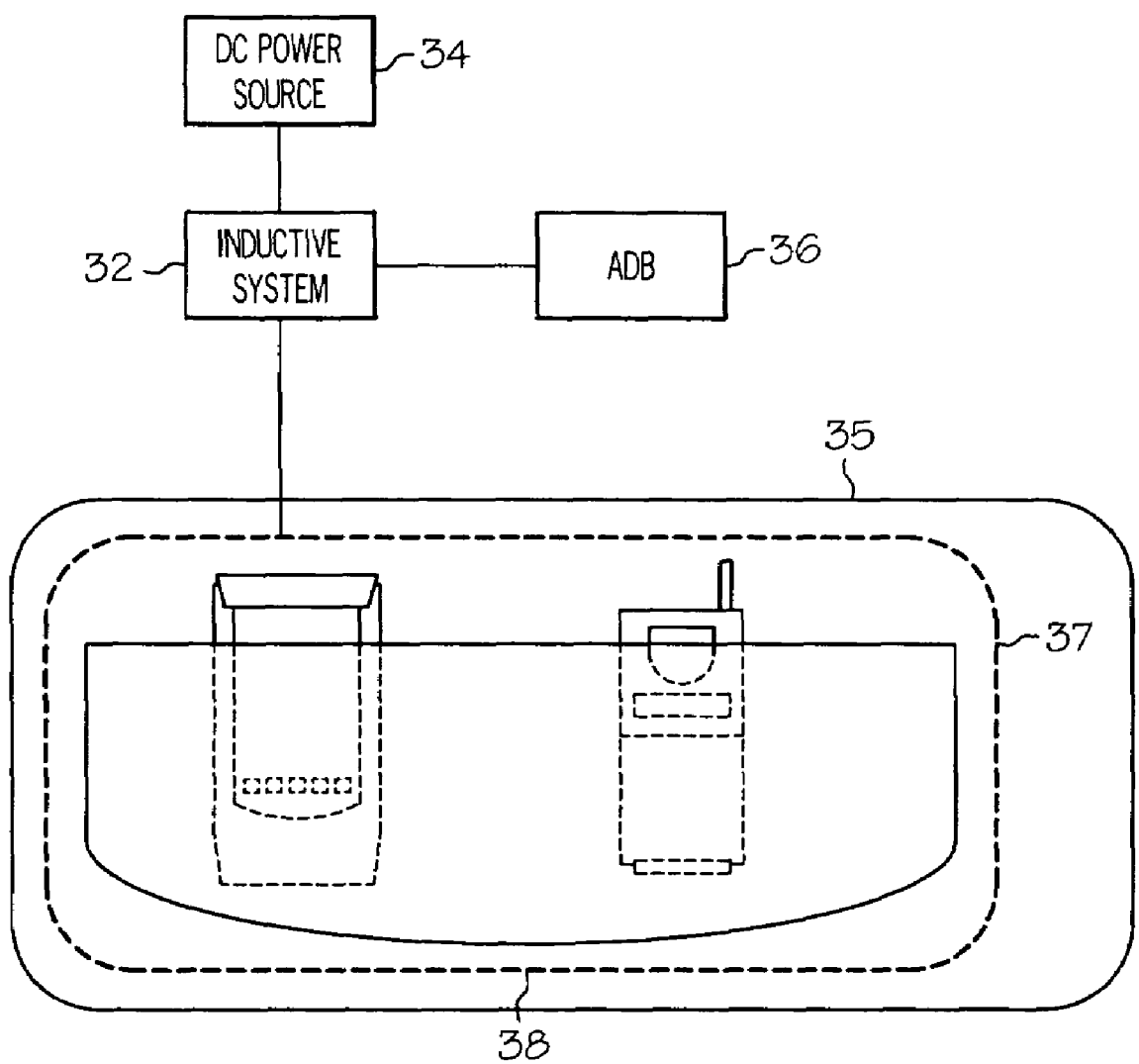
FIG. 5 shows an overhead view of the inductive vehicle adapter.

FIG. 5 shows a vehicle visor 35 which is a holder of the remote devices. Primary 38 is contained within visor 35. The remote devices could be placed within bag 37. The remote devices placed within mesh bag 37 could be charged by the inductive vehicle interface and be in communication with ADB 36. Any mechanism could be used to hold the remote devices within proximity of primary 38, such as Velcro or clips.

The location of primary 38 could be in any convenient location. For example, primary 38 could be included within a bowl located in the trunk of a vehicle, an overhead console, a seat back, a glove compartment or a side door stowage area.

Figure 6:
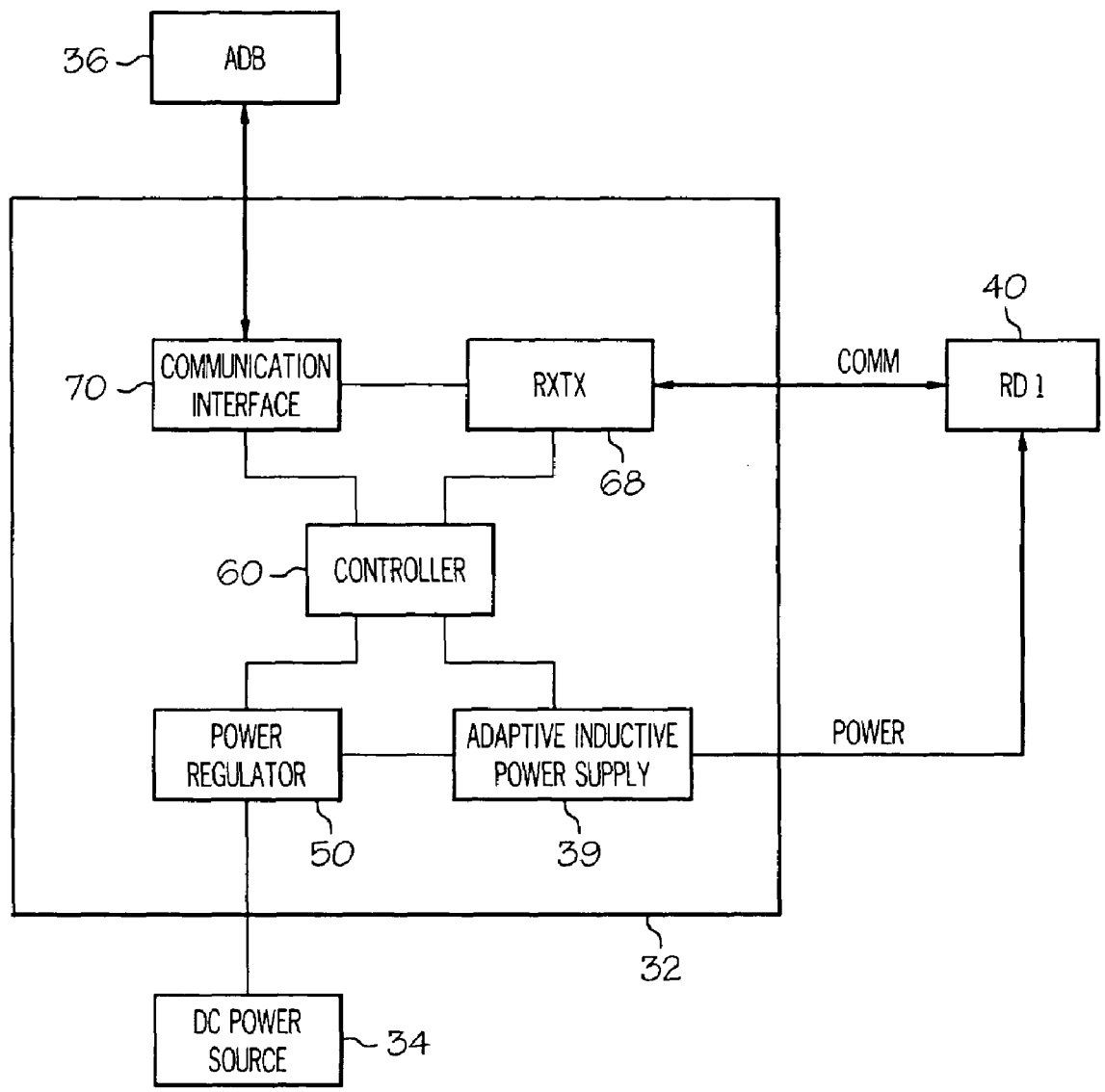
FIG. 6 shows a general block diagram of the inductive vehicle adapter.

FIG. 6 shows a basic block diagram of inductive vehicle adapter 20. Remote device 40 has been placed within holder 28 and thus is inductively coupled by way of the primary within the lip of holder 28 to adaptive inductive power supply 39. Remote device 40 could thus be charged by adaptive inductive power supply 39. At the same time, remote device 40 is coupled to transceiver 68. Transceiver 68 communicates directly with remote device 40.

Communication interface 70 manages communications between remote device 40 and ADB 36. For example, communication interface 70 may assign an IP (Internet Protocol) address to remote device 40 or may assign some other address to remote device 40 as required by the protocol of ADB 68. Communication interface 70 could control, establish or monitor the rate of communication between ADB 68 and remote device 40 as well as the various protocols and communication layers.

Controller 60 is optional. If present, it could manage the communication between remote device 40 and ADB 36. Alternatively, controller 60 could manage the supply of power to remote device 40 by adaptive inductive power supply 39. Power regulator 50 regulates the power received from DC power source 34. DC power source 34 is supplied by the electrical power system of the vehicle.

Adaptive inductive power supply 39 could be either digital or analog. One type of adaptive inductive power supply is described in U.S. Pat. No. 6,436,299, which is hereby incorporated by reference. Alternatively, the adaptive inductive power supply 39 could be of the type described hereinafter.

Figure 7:
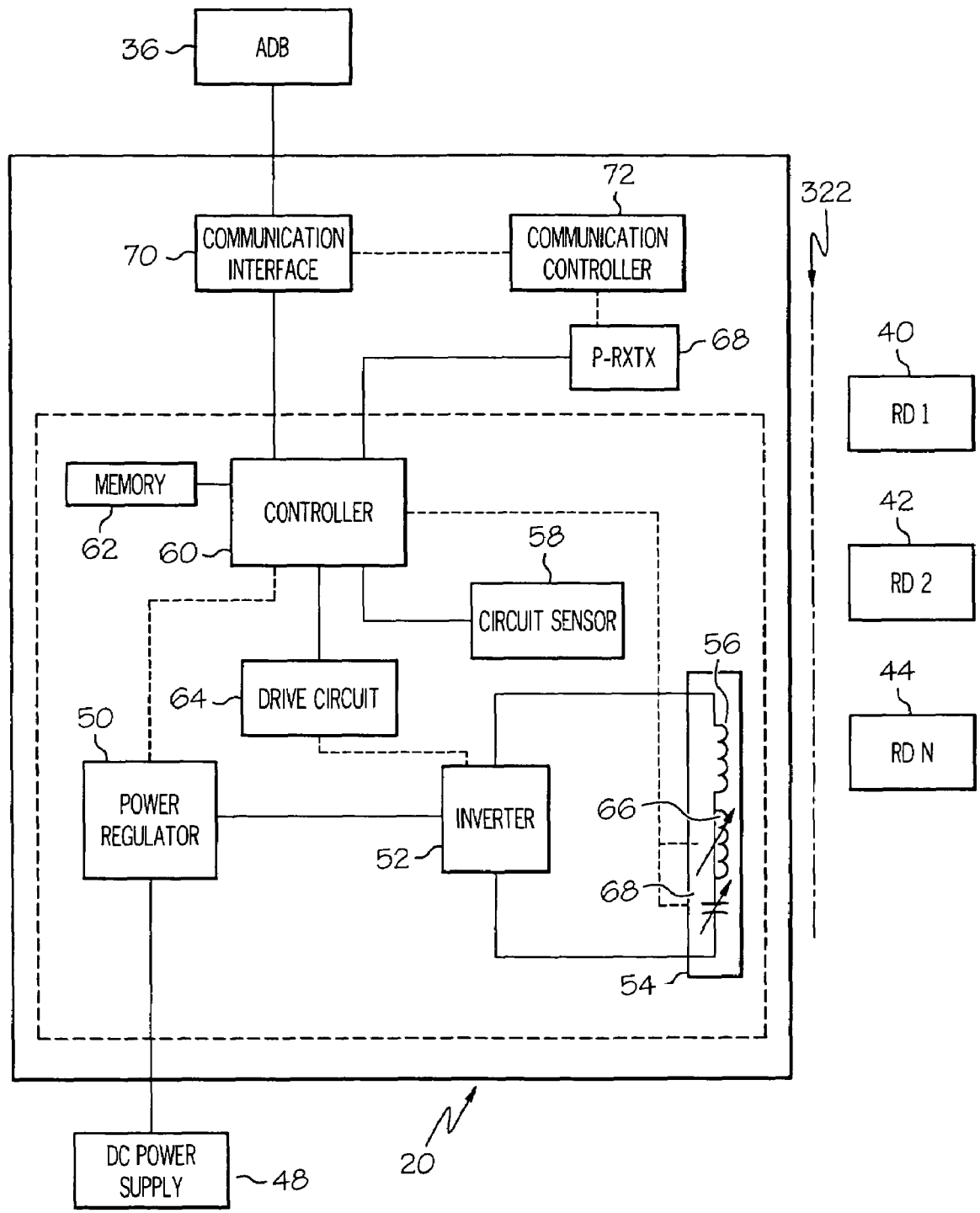
FIG. 7 shows a more detailed block diagram of the inductive vehicle adapter.

FIG. 7 shows a block diagram for inductive vehicle interface 20. Inductive vehicle interface 20 is shown coupled to three remote devices 40, 42, 44.

Power regulator 46 is coupled to external DC (direct current) power source 48. DC power source 48 provides power to inductive vehicle interface 20. DC power source 48 is supplied by the vehicle, and would usually be around 12 VDC.

Power regulator 50 controls the voltage and current provided by DC power source 48 to inverter 52. Inverter 52 converts the DC power to AC (alternating current) power. Inverter 52 acts as an AC power source supplying the AC power to tank circuit 54. Tank circuit 54 is a resonant circuit. Tank circuit 54 is inductively coupled by way of primary winding 56 to the secondary windings within remote devices 40, 42, 44. Primary winding 56 and the secondary windings of remote devices 40, 42, 44 are coreless windings. Dashed line 58 indicates an air gap between remote device 40, 42, 44 and primary winding 56. Primary winding 56 is contained within perimeter 30.

Circuit sensor 58 is coupled to the output of tank circuit 54. Circuit sensor 58 is also coupled to controller 60. Circuit sensor 58 provides information regarding the operation parameters of inverter 52 and tank circuit 54. For example, circuit sensor 58 could be a current sensor and provide information regarding the phase, frequency and amplitude of the current in tank circuit 54.

Controller 60 could be any one of a multitude of commonly available microcontrollers programmed to perform the functions hereinafter described, such as the Intel 8051 or the Motorola 6811, or any of the many variants of those microcontrollers. Controller 60 could have a ROM (read only memory) and RAM (random access memory) on the chip. Controller 60 could have a series of analog and digital outputs for controlling the various functions within the adaptive inductive power supply. The functionality of controller 60 could also be accomplished with a microprocessor and memory chips.

Controller 60 is connected to memory 62. Controller 60 is also coupled to drive circuit 64. Drive circuit 64 regulates the operation of inverter 52. Drive circuit 64 regulates the frequency and timing of inverter 52. Controller 60 is also coupled to power regulator 50. Controller 60 can manipulate the output voltage of power regulator 50. As is well known, by altering the rail voltage of power regulator 50, the amplitude of the output of inverter 52 is also altered.

Finally, controller 60 is coupled to variable inductor 66 and variable capacitor 68 of tank circuit 54. Controller 60 can modify the inductance of variable inductor 66 or the capacitance of variable capacitor 68. By modifying the inductance of variable inductor 66 and the capacitance of variable capacitor 68, the resonant frequency of tank circuit 54 can be changed.

Tank circuit 54 could have a first resonant frequency and a second resonant frequency. Tank circuit 54 could also have several resonant frequencies. As used herein, the term "resonant frequency" refers to a band of frequencies within which tank circuit 54 will resonate. As is well known, a tank circuit will have a resonant frequency, but will continue to resonate within a range of frequencies near the resonant frequency. Tank circuit 54 has at least one variable impedance element having a variable impedance. By varying the variable impedance, the resonant frequency of the tank circuit will be varied. The variable impedance element could be variable inductor 66, variable capacitor 68, or both.

Variable inductor 66 could be a thyristor controlled variable inductor, a compressible variable inductor, parallel laminated core variable inductor, a series of inductors and switches capable of placing select fixed inductors into tank circuit 54, or any other controllable variable inductor. Variable capacitor 68 could be a switched capacitor array, a series of fixed capacitors and switches capable of placing select fixed capacitors into tank circuit 54, or any other controllable variable capacitor.

Tank circuit 54 includes primary winding 56. Primary winding 56 and variable inductor 66 are shown separate. Alternatively, primary winding 56 and variable inductor 66 could be combined into a single element. Tank circuit 54 is shown as a series resonant tank circuit. A parallel resonant tank circuit could also be used.

Power supply transceiver 68 is also coupled to controller. Power supply transceiver 68 could be simply a receiver for receiving information rather than a device enabling two-way communication. Power supply transceiver 68 communicates with various remote devices 40, 42, 44. Obviously, more or less devices than three could be used with the system.

Inductive vehicle interface 20 also has communication interface 70 for connection to ADB 36. Communication interface 70 manages the communications between remote devices 40, 42, 44 and ADB 36. Communication interface 70 may need to perform functions such as translating the communications from one protocol to the next and assigning network addresses to remote devices 40, 42, 44.

Inductive vehicle interface 20 could also have communication controller 72. Communication controller 72 manages data input and output through communication interface 70 and interface transceiver 74. Communication controller 72 performs necessary control functions such as code conversion, protocol conversion, buffering, data compression, error checking, synchronization and route selection as well as collects management information. Communication controller 72 establishes communication sessions between remote devices 40, 42, 44 and ADB 36 or any other devices coupled to ADB 36. Communication controller 72 could be a front end communication processor. Depending upon the capabilities of controller 60, communication controller 72 could be a software module running within controller 60.

Figures 8, 10:
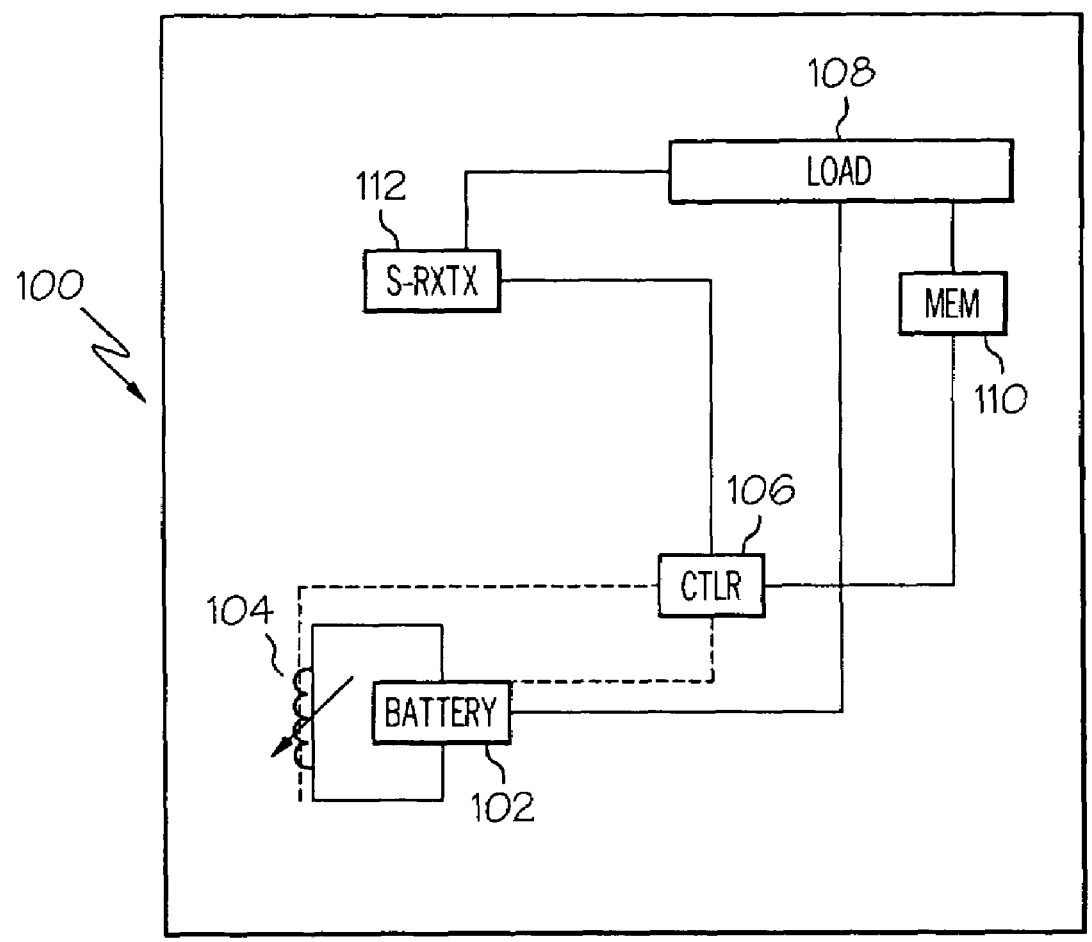
FIG. 8 shows a block diagram of a remote device capable of interfacing with the inductive vehicle adapter.
FIG. 10 shows a device list.

FIG. 8 shows a block diagram of remote device 100. Remote device 100 is exemplary of remote devices 40, 42, 44. Remote device 100 includes rechargeable battery 102. Rechargeable battery 102 receives power from variable secondary 104. Depending upon the type of rechargeable battery, further circuiting to support recharging rechargeable battery 102 could be included. For example, if a Li-ion (Lithium Ion) LiPoly (lithium-polymer) battery were used, an integrated circuit controlling the charging of the battery such as the Texas Instrument bq240001 or the Texas Instrument UCC3890 could be incorporated into remote device 100. If a NiMh (Nickel Metal Hyrdride) battery were used, a Microchip Technology PS402 battery management integrated circuit could be used.

Variable secondary 104 is coreless, allowing variable secondary 104 to operate over a wider range of frequencies. Variable secondary 104 is shown as a variable inductor, although other types of devices could be used in place of the variable inductor.

Variable secondary 104 could include a multidimensional secondary such as the one shown in U.S. patent application Ser. No. 10/689,224, entitled "Coil Assembly" and assigned to the assignee of this application. If variable secondary included such a multidimensional winding, remote device 40 would be able to receive power from primary winding 56 without regard to the physical orientation of remote device 40 relative to primary winding 56 as long as remote device 40 were proximal to primary winding 56. Thus, a user would be spared the inconvenience of positioning remote device 40 in a specific orientation in order to charge remote device 40.

Remote device controller 106 controls the inductance of variable secondary 104 and the operation of load 108. Remote device controller 106 can alter the inductance of variable secondary 104 or turn on or off load 108. Similar to controller 60, remote device controller 106 could be any one of a multitude of commonly available microcontrollers programmed to perform the functions hereinafter described, such as the Intel 8051 or the Motorola 6811, or any of the many variants of those microcontrollers. Controller 106 could have a ROM (read only memory) and RAM (random access memory) on the chip. Controller 106 could also have a series of analog and digital outputs for controlling the various functions within the adaptive inductive power supply.

Memory 110 contains, among other things, a device ID (identification) number and power information about remote device 100. Power information would include the voltage, current and power consumption information for remote device 100. Memory 110 might include discharge rates and charging rates for battery 102.

Remote device 100 also includes remote transceiver 112. Remote transceiver 112 receives and transmits information to and from power supply transceiver 68. Remote transceiver 112 and power supply transceiver 68 could be linked in a myriad of different ways, such as WIFI, infrared, blue tooth, radio frequency (RF) or cellular. Additionally, the transceivers could communicate by way of additional coils on the primary or secondary. Or, since power in being delivered by power supply 20 to remote devices 100, any one of many different power line communication systems could be used.

Alternatively, remote transceiver 112 could be simply a wireless transmitter for sending information to power transceiver 68. For example, remote transceiver 112 could be an RFID (Radio Frequency Identification) tag.

Load 108 represents the functional component of remote device 338. For example, if remote device 100 were a digital camera, load 108 could be a microprocessor within the digital camera. If remote device 100 were an MP3 player, load 108 could be a digital signal processor or a microprocessor and related circuitry for converting MP3 files into sounds. If remote device 100 were a PDA, then load 108 would be a microprocessor and related circuitry providing the functionality of a PDA. Load 108 could access memory 110.

Figure 9:
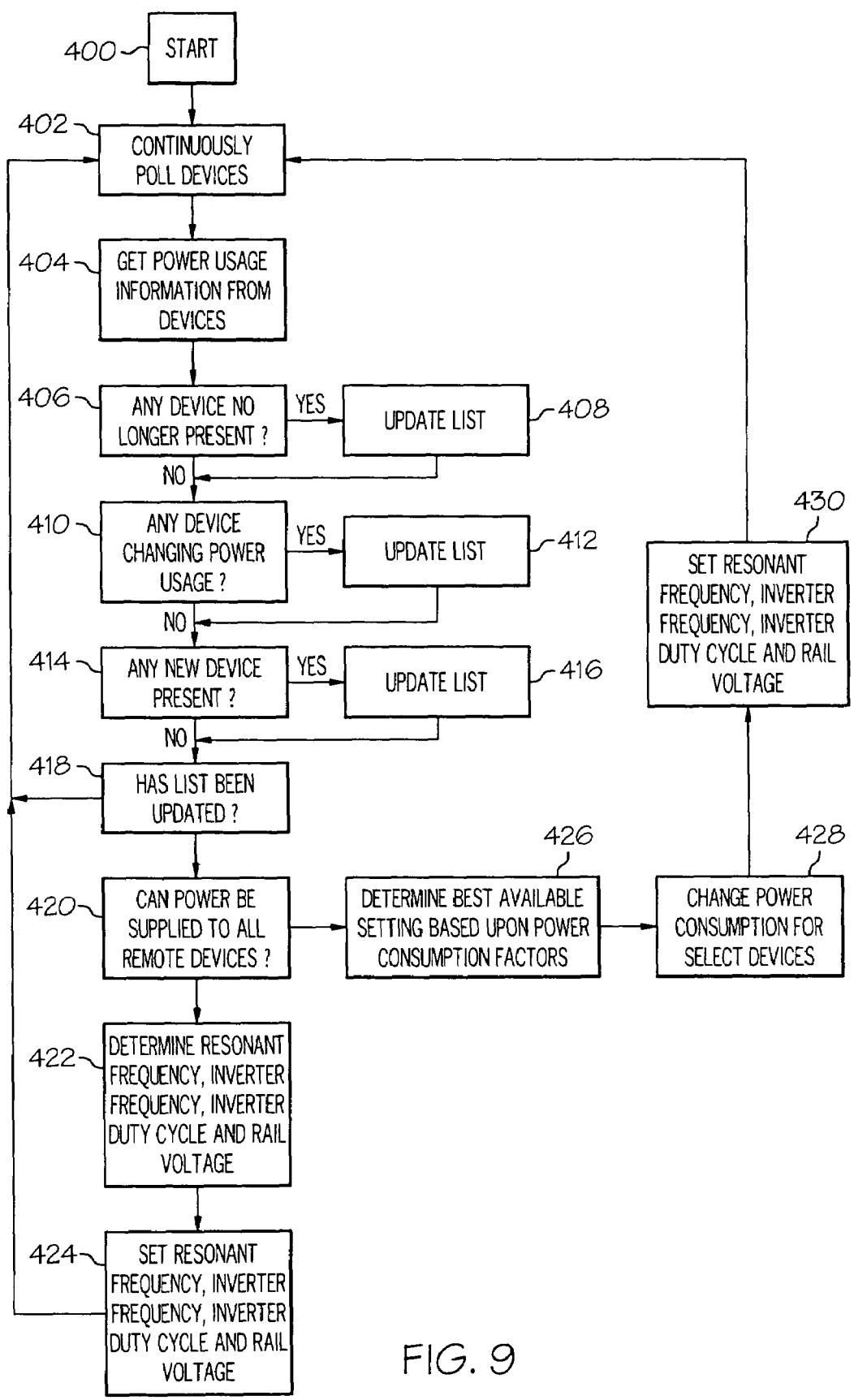
FIG. 9 shows a flow chart of the operation of the inductive vehicle adapter.

Load 108 is also coupled to secondary device transceiver 112. Thus, load 108 could communicate through secondary device transceiver 112 with inductive vehicle interface 20, and thereby could communicate with any other devices connected to ADB 36. FIG. 9 shows the operation of one embodiment of the adaptive contactless energy transmission system with communications capability.

After inductive vehicle interface 20 starts (Step 400), it polls all remote devices by way of transceiver 68. Step 402. Step 402 could be continuous, where advancement to Step 404 occurs only if a remote device is present. Alternatively, the following steps could be performed before polling is repeated, although the operations would be performed with reference to a null set. If any remote device is present, it receives power usage information from the remote device. Step 404.

The power usage information could include actual information regarding voltage, current, and power requirements for remote device 40. Alternatively, power usage information could be simply an ID number for remote device 40. If so, controller 60 would receive the ID number and look up the power requirement for remote device 40 from a table contained in memory 62.

After all devices have been polled and the power information for each device has been received, inductive vehicle interface 20 then determines whether any device is no longer present. If so, then a remote device list is updated. Step 408.

One embodiment of the remote device list maintained by controller 60 is shown in FIG. 10. The remote device list could contain for a device ID, a voltage, a current, and a status for each remote device 40, 42, 44. The device number can be assigned by controller 60. The device ID is received from remote devices 40, 42, 44. If two remote devices are the same type, then the device ID could be the same. The voltage and current are the amount of voltage or current required to power the device. The voltage and current could be transmitted discretely by remote devices 40, 42, 44, or they could be obtained by using the device ID as a key to a database of remote devices maintained in memory 62. The status is the current status of the device. For example, the device status could be 'on', 'off', 'charging', etc.

Next, inductive vehicle interface 20 determines whether the status of any device has changed. Step 410. For example, remote device 40 could have a rechargeable battery or other charge storage device. When the rechargeable battery is fully charged, remote device 40 would no longer need power. Thus, its status would change from "Charging" to "Off." If the status of the device changes, then the remote device list is updated. Step 412.

Inductive vehicle interface 20 then determines if any devices are present. Step 414. If so, then the remote device list is updated. Step 416. The remote device list is then checked. Step 418. If the list was not updated, the system then polls the devices again, and the process restarts. Step 402.

If the list was updated, then the power usage by the remote devices has changed, and thus the power supplied by inductive vehicle interface 20 must also change. Controller 60 uses the remote device list to determine the power requirements of all the remote devices. It then determines if the system can be reconfigured to adequately power all the devices. Step 420.

If inductive vehicle interface 20 can supply power to all of the remote devices, then controller 60 calculates the settings for inverter frequency, duty cycle, resonant frequency, and rail voltage. Further, controller 60 determines the best setting for the variable impedance of secondary winding 104 of remote device 40. Step 422. It then sets the inverter frequency, duty cycle, resonant frequency, and rail voltage. Step 424. It also instructs remote device 40 to set the variable impedance of secondary winding 104 to the desired level. Step 424.

On the other hand, if inductive vehicle interface 20 cannot supply power to all of the remote devices, controller 60 determines the best possible power settings for the entire system. Step 426. It may then instruct one or more of remote devices 40, 42, 44 to turn off or change its power consumption. Controller 60 determines the best setting for the variable impedance of secondary winding 104 of remote devices 40, 42, 44. Step 428. It then sets the inverter frequency, duty cycle, resonant frequency, and rail voltage for the system. Step 430. Controller instructs remote devices 40, 42, 44 to set the variable impedance of secondary winding 104 at the desired level. The system then returns to polling the devices, and the process repeats. Step 402.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A system for supplying power from a primary coil side to a plurality of remote devices, the system comprising:
   an inductive power supply having a primary coil for supplying power to at least one of the plurality of remote devices, the inductive power supply having a communication system for communicating with the at least one of the plurality of remote devices;
   a data network including a controller and the inductive power supply; and
   wherein the controller is located on the primary coil side and is configured to
   1) obtain power usage information for the at least one of the plurality of remote devices;
   2) determine whether power can be supplied to the at least one of the plurality of remote devices as a function of the obtained power usage information;
   3) adjust power consumption characteristics of the system in response to a determination that power cannot be supplied to the at least one of the plurality of remote devices.

2. The system of claim 1 wherein the power consumption characteristics include an amount of power consumption of one or more of the plurality of remote devices.

3. A vehicle interface for providing power from a primary coil side to at least one of a plurality of remote devices and communicating with the at least one of the plurality of remote devices, the vehicle interface comprising:
   a holder for containing the at least one of the plurality of remote devices;
   an inductive power supply, the inductive power supply having a primary coil, the primary coil placed proximal to the holder;
   a communication system located on the primary coil side for enabling communication with the at least one of the plurality of remote devices, the communication system receives power usage information from the at least one of the plurality of remote devices; and
   a controller located on the primary coil side configured to use the power usage information to
   1) determine the power requirements of the at least one of the plurality of remote devices; and
   2) reconfigure the vehicle interface to power the at least one of the plurality of remote devices as a function of the determined power requirements.

4. The vehicle interface of claim 3 where the holder is configured to fit within a console of a vehicle.

5. The vehicle interface of claim 3 where each of the plurality of remote devices are selected from the group comprising a device located in a trunk of the vehicle, a device located in an overhead console of the vehicle, a device located in a seat back of the vehicle, a device located in a glove compartment of the vehicle and a device located in a side door storage area of the vehicle.

6. The vehicle interface of claim 3 where the vehicle has a vehicle data bus, and the vehicle interface is connectable to the vehicle data bus via a gateway controller coupled to the vehicle interface, the gateway controller manages communication between the vehicle interface and the vehicle data bus.

7. The vehicle interface of claim 3 wherein the communication system includes a transceiver for communicating with the plurality of remote devices.

8. The vehicle interface of claim 3 wherein the power usage information is selected from the group comprising: actual voltage, actual current, power requirements, a device ID or any combination thereof.

9. A power supply and communication system for a vehicle for providing power from a primary coil side to at least one of a plurality of remote devices, the power supply and communication system comprising:
   an inductive power supply located on the primary coil side for inductively supplying power to the at least one of the plurality of remote devices; and
   a communication system located on the primary coil side enabling communications between the at least one of the plurality of remote devices and the vehicle, wherein the communication system is configured to
   1) periodically receive power usage information from the at least one of the plurality of remote devices;
   2) determine whether the power usage information has changed; and 3) reconfigured the inductive power supply in response to a determination that the power usage information has changed.

10. The power supply and communication system of claim 9 where the communication system comprises a transceiver for communicating with the plurality of remote devices.

11. The power supply and communication system of claim 10 further comprising a vehicle data bus and a communication controller for controlling communication between the plurality of remote devices and the vehicle data bus.

12. The power supply and communication system of claim 9 where the communication system comprises a power line communication protocol using the inductive power supply.

13. The power supply and communication system of claim 10 where the transceiver includes an antenna for wireless communication with the remote device.

14. The power supply and communication system of claim 13 where the transceiver communicates with the power supply and communication system by way of a wireless protocol.

15. The power supply and communication system of claim 14 where the inductive power supply includes an inverter and a primary.

16. The power supply and communication system of claim 15 where inductive power supply includes a drive circuit for driving the inverter.

17. The power supply and communication system of claim 16 where a power regulator is coupled to the vehicle power supply and to the inverter.

18. The power supply and communication system of claim 17 further comprising a holder for receiving one of the plurality of remote devices.

19. The power supply and communication system of claim 18 where the holder has a perimeter, and the primary is contained within the perimeter.

20. The power supply and communication system of claim 19 where the primary is adaptable to supply power to the remote device regardless of the orientation of the remote device.

21. The power supply and communication system of claim 20 where the transceiver can communicate with the plurality of remote devices regardless of the orientation of the plurality of remote devices.

* * * * *

UNITED STATES PATENT AND TRADEMARK OFFICE
CERTIFICATE OF CORRECTION

PATENT NO.        : 7,612,528 B2
APPLICATION NO.   : 10/871420
DATED             : November 3, 2009
INVENTOR(S)       : David W. Baarman, Terry L. Lautzenheiser and Thomas Jay Leppien It is certified that error appears in the above-identified patent and that said Letters Patent is hereby corrected as shown below:

On the Title page under (63) Related U.S. Application Data, line 6, that portion of the priority claim reading "now Pat. No. 6,731,071, and a" should read --now Pat. No. 6,731,071, which is a--.

On the Title page under (63) Related U.S. Application Data, line 9, that portion of the priority claim reading "No. 10/871,420, which is a continuation-in-part" should read --No. 10/246,155, which is a continuation-in-part--.

On the Title page under (63) Related U.S. Application Data, line 28, that portion of the priority claim reading "Oct. 20, 2003, and a continuation-in-part" should read --Oct. 20, 2003, which is a continuation-in-part--.

On the Title page under (63) Related U.S. Application Data, last line 43, that portion of the priority claim reading "No. 7,126,450." should read --No. 7,126,450, application No. 10/871,420, which is a continuation-in-part of application No. 10/689,499, filed on Oct. 20, 2003, now Pat. No. 7,212,414, which is a continuation-in-part of application No. 10/175,095, filed on Jun. 18, 2002, now Pat. 6,673,250, which is a continuation-in-part of application No. 09/592,194, filed on Jun. 12, 2000, now Pat. 6,436,299.--.

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,612,528 B2 Page 1 of 1
APPLICATION NO. : 10/871420
DATED : November 3, 2009
INVENTOR(S) : Baarman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

Nineteenth Day of October, 2010

David J. Kappos
*Director of the United States Patent and Trademark Office*